US008332869B2

(12) United States Patent
Stevens, IV

(10) Patent No.: US 8,332,869 B2
(45) Date of Patent: Dec. 11, 2012

(54) SYSTEMS AND METHODS FOR PROVIDING WAKE ON LAN (WOL) SUPPORT

(75) Inventor: Robert Talbott Stevens, IV, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1420 days.

(21) Appl. No.: 11/944,144

(22) Filed: Nov. 21, 2007

(65) Prior Publication Data

US 2009/0133040 A1    May 21, 2009

(51) Int. Cl.
*G06F 3/00*     (2006.01)
*G06F 11/00*    (2006.01)
(52) U.S. Cl. .......................................... 719/315; 714/22
(58) Field of Classification Search ........................ None
See application file for complete search history.

(56) References Cited

U.S. PATENT DOCUMENTS

| 7,325,149 | B2 | 1/2008 | Liu et al. ...................... 713/300 |
| 2005/0138470 | A1* | 6/2005 | Cromer et al. .................. 714/22 |
| 2006/0179476 | A1* | 8/2006 | Challener et al. ................. 726/4 |
| 2006/0236376 | A1* | 10/2006 | Liu et al. ........................... 726/4 |
| 2007/0070998 | A1 | 3/2007 | Sethuram et al. ............. 370/389 |

OTHER PUBLICATIONS

Magic Packet Technology, White Paper, Advanced Micro Devices, Inc., 6 pages, 1998.
U.S. Patent Application Entitled "System and Method for Assigning Addresses to Information Handling Systems", Nguyen et al., 19 pages, Jun. 29, 2006.

* cited by examiner

*Primary Examiner* — Andy Ho
*Assistant Examiner* — Tuan Dao
(74) *Attorney, Agent, or Firm* — Baker Botts L.L.P.

(57) ABSTRACT

A system includes a management controller coupled to and configured to manage a plurality of information handling systems. Each of the information handling systems may include a network interface device configured to receive wake-up messages remotely via a network. The management controller is operable to receive a wake-up message remotely via the network; identify a particular one of the information handling systems to be awakened from a non-awake state based on an address included in the wake-up message; and forward the wake-up message to the particular information handling system to cause the particular information handling system to awaken. The network interface device of the particular information handling system may remain unpowered while the wake-up message is received and forwarded by the management controller.

20 Claims, 3 Drawing Sheets

SYSTEMS AND METHODS FOR PROVIDING WAKE ON LAN (WOL) SUPPORT

TECHNICAL FIELD

The present disclosure relates in general to remote management of information handling systems, and more particularly to systems and methods for providing Wake on LAN (WoL) support using a management controller as a network interface proxy.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Remote control or management of information handling systems has become an important aspect of network management. For example, Wake on LAN (WoL) technology has become an invaluable addition to networks of managed information handling systems, as it allows an administrator to power on an information handling system remotely, e.g., for system backups, installation of new software, or providing other maintenance.

WoL support is typically implemented in the motherboard of the information handling system. Most modern motherboards with an embedded Ethernet controller support WoL without the need for an external WoL cable. Older motherboards may require a WAKEUP-LINK header onboard and connected to the network card via a special 3-pin cable.

WoL must be enabled in the Power Management section of the motherboard's BIOS or operating system. It may also be necessary to configure the information handling system to reserve power for the network card when the system is shut down. In addition, in order to get WoL to work it is sometimes required to enable this feature on the card.

In general, waking up an information handling system in a LAN (e.g., a server blade) remotely can be explained as follows. The target blade is shut down, although power is still supplied to the blade's network card. The network card listens for a specific broadcast packet, called the "Magic Packet." The blade receives the Magic Packet, checks it for the correct information, and then boots if the Magic Packet is valid.

The Magic Packet is a broadcast frame that can be sent over a variety of connectionless protocols (e.g. UDP or IPX), with UDP being the most commonly used. The data contained in a Magic Packet is the defined constant as represented in hexadecimal: FF FF FF FF FF FF followed by sixteen repetitions of the target computer's MAC address, sometimes followed by a four or six byte password.

WoL is fairly easy to implement at the network controller level, but has some inherent drawbacks. In particular, as mentioned above, WoL requires that the target computer's network card remains powered in order to listen for the Magic Packet or similar wake-up message. This may be especially undesirable in blade systems where the high density of compute resources and network controllers may place a fairly large power demand on the power subsystem even in cases where the blades are otherwise powered down. Historically, some blade implementers have avoided supporting WoL at least in part due to this power management issue. However, as MICROSOFT has made WoL support a requirement for Windows Hardware Quality Labs (WHQL) system certification, improved implementation of WoL—particularly in systems such as server blade systems—has become more important that ever.

SUMMARY

In accordance with the teachings of the present disclosure, disadvantages and problems associated with providing Wake on LAN (WoL) support have been reduced.

In accordance with one embodiment of the present disclosure, a system includes a management controller coupled to and configured to manage a plurality of information handling systems. Each of the information handling systems may include a network interface device configured to receive wake-up messages remotely via a network. The management controller is operable to receive a wake-up message remotely via the network; identify a particular one of the information handling systems to be awakened from a non-awake state based on an address included in the wake-up message; and forward the wake-up message to the particular information handling system to cause the particular information handling system to awaken. The network interface device of the particular information handling system may remain unpowered while the wake-up message is received and forwarded by the management controller.

In accordance with another embodiment of the present disclosure, a method for managing a remote wake-up of an information handling system is provided. A wake-up message is received at a management controller coupled to and configured to manage a plurality of information handling systems. The wake-up message is received from a remote system via a network, and includes an address identifying a particular one of the information handling systems to be awakened from a non-awake state. The management controller identifies the particular information handling system based at least on the address included in the received wake-up message, and forwards the wake-up message to the particular information handling system to cause the particular information handling system to awaken. A network interface device of the particular information handling system that is configured to receive wake-up messages via the network remains uppowered while the wake-up message is received and forwarded by the management controller.

In accordance with a further embodiment of the present disclosure, a management controller for managing a plurality of information handling systems is provided. Each of the plurality of information handling systems includes a network interface device configured to receive wake-up messages remotely via a network. The management controller may be configured to: receive a wake-up message remotely via the network, the wake-up message including an address identifying a particular one of the information handling systems to be awakened from a non-awake state; identify the particular information handling system based at least on the address included in the received wake-up message; and forward the wake-up message to the particular information handling system to cause the particular information handling system to awaken. The network interface device of the particular information handling system configured to receive wake-up messages remotely via the network may remain unpowered while the wake-up message is received and forwarded by the management controller.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
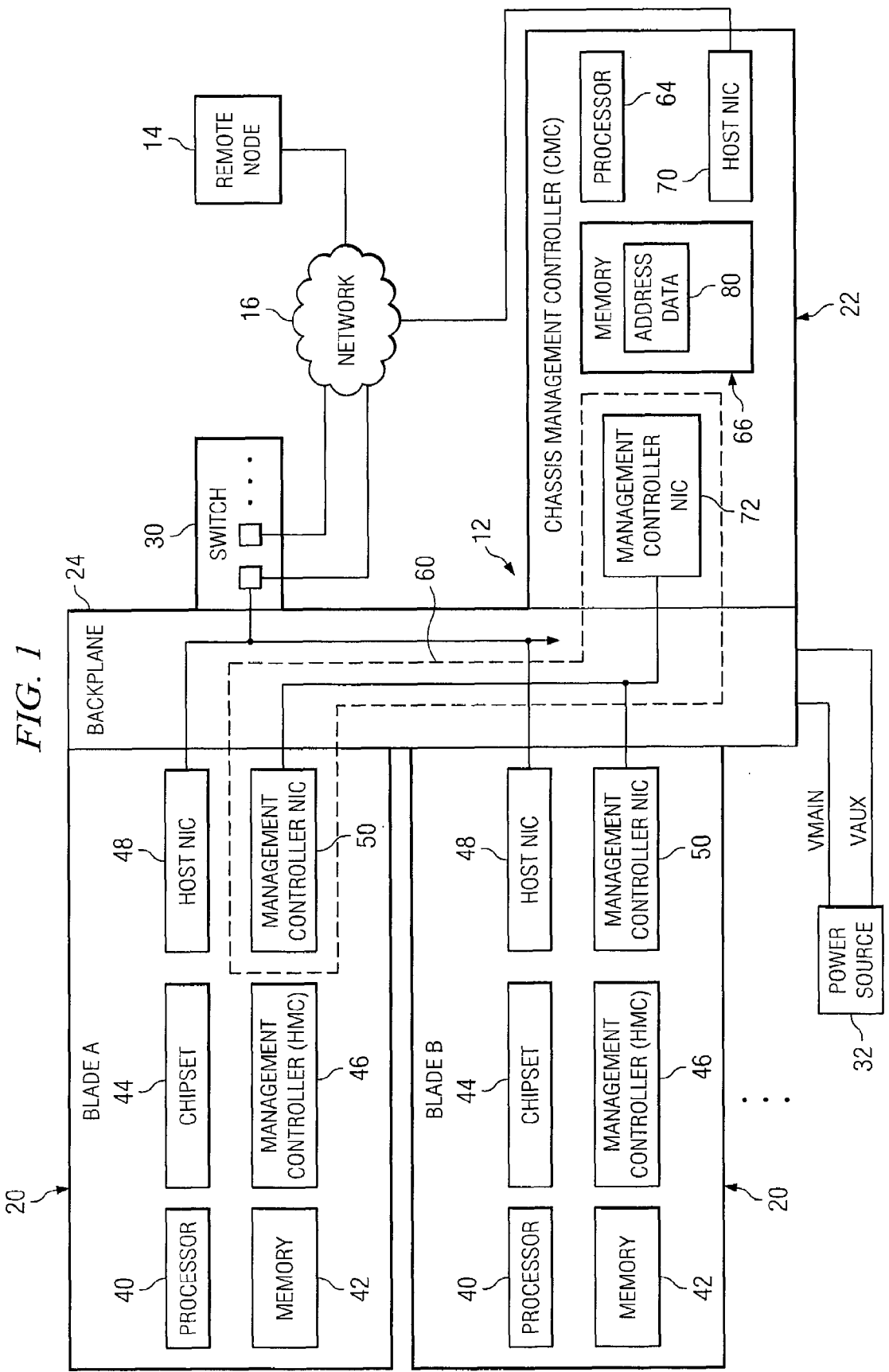
FIG. 1 illustrates a system 12 for providing Wake on LAN (WoL) support using a management controller as a network interface proxy, according to an embodiment of the disclosure.
Figure 2:
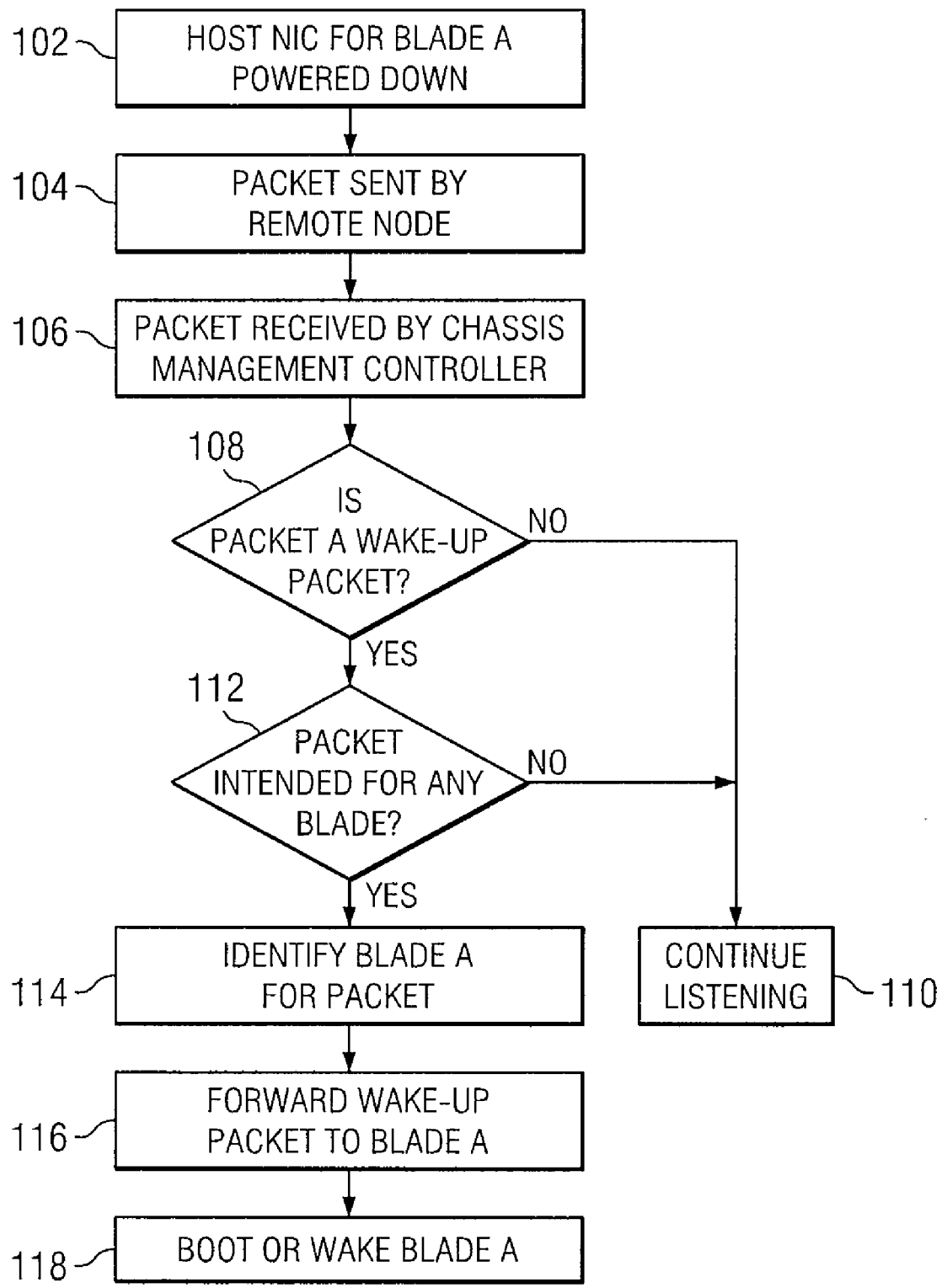
FIG. 2 is a flowchart illustrating an example method for managing a remote wake-up of an information handling system using a chassis management controller, according to certain embodiments of the present disclosure.
Figure 3:
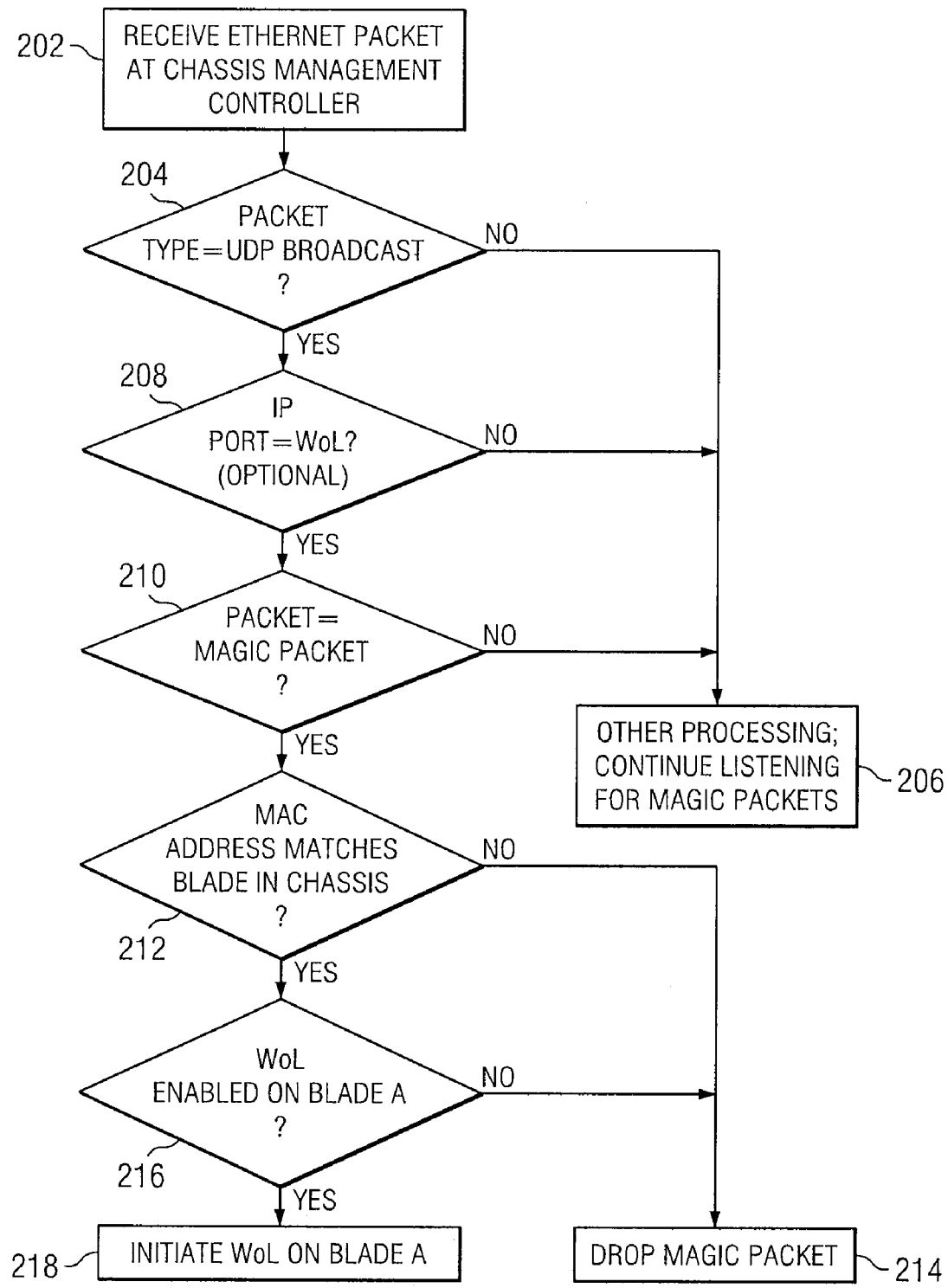
FIG. 3 is a flowchart illustrating an example method for processing a Magic Packet according to a particular embodiment of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Also, for the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a system 12 for providing Wake on LAN (WoL) support using a management controller as a network interface proxy, according to an embodiment of the disclosure. System 12 may comprise any one or more information handling systems. In some embodiments, such as the example embodiment shown in FIG. 1 and discussed below, system 12 may comprise a multi-blade server system 12 coupled to a remote node 14 via a network 16.

System 12 may include any number of server blades 20 and a chassis management controller (CMC) 22 coupled to a backplane 24. System 12 may also include a switch 30 providing an interface to network 16, and a power source 32 for providing power to system 12.

Each server blade 20 may comprise any information handling system configured to be awakened or booted remotely, e.g., via network 16. For example, each blade 20 may be configured for WoL support such that a blade 20 may be awakened in response to a wake-up message received from a remote node 14 via network 16. As used herein, a "wake-up message" or "wake-up packet" may refer to any message or communication used for waking (e.g., booting or powering up) one or more information handling systems (e.g. one or more blades 20) from a non-awake status (e.g., a sleep, standby, or powered down status). For example, wake-up messages may include Magic Packets; ping communications; or various other so-called "interesting packet" types or protocols, e.g., Direct IP, ARP, Neighbor Discovery Multicast Address packet, Internetwork Package Exchange (IPX) Diagnostic Packet, or NetBIOS Name Query packet. In addition, a "wake-up message" may be a signal or other event that triggers a wake-up. Thus, a network event detected by a controller (e.g., a host management controller 46 or chassis management controller 22, which are discussed below) that causes a blade 20 to wake up may be referred to as a "wake-up message" despite not including a "message" per se. Such events may include, e.g., a link status change event detected by host management controller 46 or chassis management controller 22.

Backplane 24 may comprise any physical and/or electrical devices for connecting the various components of system 12 to each other. For example, in the illustrated embodiment, backplane 24 may comprise any physical and/or electrical devices for connecting blades 20, CMC 22, switch 30, and/or any other components of system 12 to each other. In some embodiments, backplane 24 may comprise a circuit board with connections for receiving blades 20 and CMC 22. Backplane 24 may include one or more busses and/or other communication channels for communicating data between blades 20, CMC 22, and switch 30. Although the term "backplane" is used herein, a midplane or other suitable device for interconnecting blades 20 and CMC 22 may similarly be used.

Switch 30 may comprise any suitable switch, router, or other device for switching, routing, and/or otherwise managing the communication of data between network 16 and multiple blades 20.

Power source 32 may comprise any one or more sources of power for providing power to one, some or all components of system 12. For example, power source 32 may include one or more AC-DC converters to convert AC power (e.g., from a utility outlet) to DC power to supply to components of system 12. In some embodiments, power source 32 may include redundant or backup power supplies. In addition, power source 32 may provide (a) a main power supply, indicated in FIG. 1 as Vmain, and (b) an auxiliary power supply, indicated in FIG. 1 as Vaux. Vmain may generally be used to provide power to blades 20 when operating at full power, and CMC 22 and switch 30 when the chassis is powered on. Vaux may generally be used to provide power to auxiliary components, e.g., when Vmain is not being supplied to one or more blades 20. For example, Vaux may be used to provide power to network interface devices of blades 20 and controller 22 (e.g., devices 46, 48, 50, 70 and/or 72 discussed below).

As shown in FIG. 1, each blade 20 may include a processor 40, memory 42, a chipset 44, a host management controller (HMC) 46, one or more host network interface devices 48, and a management controller network interface device 50.

Processor 40 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 40 may interpret and/or execute program instructions and/or process data stored in memory 42 and/or another component of blade 20.

Memory 42 may be communicatively coupled to processor 40 and may comprise any system, device, or apparatus operable to retain program instructions or data for a period of time. Memory 42 may comprise random access memory (RAM), electrically erasable programmable read-only memory (EEPROM), a PCMCIA card, flash memory, magnetic storage, opto-magnetic storage, or any suitable selection and/or array of volatile or non-volatile memory. Memory 42 may include a basic input/output system (BIOS), which may include a set of instructions executed by processor 40 to boot up, or "awaken" blade 20 from a non-awake state, e.g., in response to blade 20 receiving a wake-up message, such as a Magic Packet, for example.

Chipset 44 may include a set of specialized chips for allowing communication between various components of blade 20. For example, chipset 44 may include northbride and southbridge chips linking processor 40 with other components or peripherals of blade 20, e.g., HMC 46, host network interface device 48, and/or management controller network interface device 50. In some embodiments, chipset 44 may include one or more on-integrated peripherals, e.g., Ethernet and/or USB.

HMC 46 may comprise any system or device for managing the operation of various components of blade 20. In some embodiments, HMC 46 may include a microcontroller with memory and one or more communication interfaces for communications both internal and external to blade 20. In some embodiments, may be a baseboard management controller (BMC), which in some instances may be integral with portions of management controller network interface device 50.

In some embodiments, HMC 46 may be operable to receive instructions from CMC 22 and control processor 40 or other component(s) of blade 20 to perform various functions. In particular, as described in greater detail below, HMC 46 may be operable to receive a wake-up message forwarded from CMC 22 and cause blade 20 to boot up, or "awaken" blade 20 from a non-awake state.

Host network interface device(s) 48 may include any one or more interfaces for communicatively connecting blade 20 to network 16, e.g., any combination of one or more network interface card (NIC), LAN on motherboard (LOM), Ethernet adapter card, etc. A host network interface device 48 may be operable to receive data from network 16, including wake-up messages sent from various remote nodes 14. For example, while powered on, a host network interface device 48 may be operable to receive a wake-up message via network 16 (e.g., a Magic Packet broadcast by remote node 14), identify the message as a wake-up message, and forward the wake-up message to chipset 44 or HMC 46 to initiate a wake-up process for blade 20.

Management controller network interface device 50 may provide a communications interface between blade 20 and CMC 22 via blackplane 24. For example, management controller network interface device 50 may include a network interface card (NIC), Ethernet adapter card, etc.

In some embodiments, management controller network interface device 50 may be operable to receive management data from CMC 22, including wake-up messages received by CMC 22 and forwarded to blade 20 via communication links between the various components, some of which may be provided by backplane 24.

Communication links between CMC 22 and blades 20 for communicating management traffic and/or other data may be referred to as a management communication channel, indicated generally by dashed line 60 in FIG. 1. According to embodiments of the present disclosure, CMC 22 can receive a wake-up message intended for a particular blade 20 via network 16 and forward the wake-up message to the particular blade 20 via management communication channel 60, instead of the conventional approach in which the host network interface device(s) 48 of the particular blade 20 receives and processes the incoming wake-up message. Thus, according to such embodiments, the host network interface device(s) 48 of the particular blade 20 do not need to remain powered on and waiting to receive a wake-up message when blade 20 is in a non-awake state, and thus such host network interface device(s) 48 may be powered down, which may provide power savings and/or other advantages.

As shown in FIG. 1, CMC 22 may include a processor 64, memory 66, one or more host network interface devices 70, and a management controller network interface device 72.

Processor 64, may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute software, firmware, or other program instructions and/or process data. In some embodiments, processor 64 may interpret and/or execute software or program instructions and/or process data stored in memory 66 and/or another component of CMC 22.

Memory 66 may be communicatively coupled to processor 64 and may comprise any system, device, or apparatus operable to retain program instructions or data for a period of time. Memory 66 may comprise random access memory (RAM), electrically erasable programmable read-only memory (EEPROM), a PCMCIA card, flash memory, magnetic storage, opto-magnetic storage, or any suitable selection and/or array of volatile or non-volatile memory. Memory 66 may include a basic input/output system (BIOS), which may include a set of instructions executed by processor 64 to boot CMC 22.

In some embodiments, memory 66 may store address information 80 and/or software or other program instructions for processing a received wake-up message (e.g., a Magic Packet). As used herein, "processing" a wake-up message may include any one, some, or all of the following functions:

(a) Identifying the message as a wake-up message. This may include any number of sub-processes, e.g., (i) identifying a packet type (UDP, etc.), (ii) identifying an IP port for the packet, and (iii) determining whether the packet is a wake-up message (e.g., a Magic Packet).

(b) Determining whether the wake-up message is intended for a blade 20 managed by controller 22 and/or identifying a particular blade 20 for which the wake-up message is intended. This also may include any number of sub-processes, e.g., (i) identifying an address in the wake-up message (such as a MAC address, for example), (ii) accessing a list of addresses (e.g., MAC addresses) for each blade 20 managed by controller 22, (iii) determining whether the address identified in the wake-up message matches an address for any of the blades 20 managed by controller 22; and (iv) identifying the particular blade 20 that matches the address in the wake-up message.

(c) Forwarding the wake-up message to the particular blade 20 identified as the intended target for the wake-up message. This may include forwarding the wake-up message to the particular blade 20 via management communication channel 60 such that the wake-up message need not be received or processed by a host network interface device 48 of the particular blade 20 (thus allowing the host network interface device 48 to remain powered down).

(d) Any other one or more functions suitable for processing and/or forwarding a wake-up message to the intended blade 20.

In other embodiments, some or all of such functionality for processing a wake-up message may be provided by a host network interface device 70 (e.g., by firmware or software associated with device 70), as discussed below.

Host network interface device(s) 70 may include any one or more interfaces for communicatively connecting CMC 22 to network 16, e.g., any combination of one or more network interface card (NIC), LAN on motherboard (LOM), Ethernet adapter card, etc.

A host network interface device 70 may be operable to receive data from network 16, including wake-up messages (e.g., Magic Packets) sent from various remote nodes 14. In some embodiments, host network interface device 70 may forward a received wake-up message to processor 64 or another component of controller 22 for processing the wake-up message intended to wake up one or more non-awake blades 20, e.g., as discussed above. In other embodiments, host network interface device 70 may include or have associated firmware, software, or other program instructions for processing the wake-up message.

Management controller network interface device 72 may provide a communications interface between CMC 22 and blades 20 via management communication channel 60. For example, management controller network interface device 72 may include a network interface card (NIC), Ethernet controller, etc. In some embodiments, management controller network interface device 72 may be operable to forward management data to one or more blades 20 via management communication channel 60, including wake-up messages received and processed by CMC 22.

FIG. 2 is a flowchart illustrating an example method 100 for managing a remote wake-up of an information handling system using a CMC 22, according to certain embodiments of the present disclosure.

According to one embodiment, method 100 preferably begins at step 102. As noted above, teachings of the present disclosure may be implemented in a variety of configurations of system 12. As such, the preferred initialization point for method 100 and the order of the steps 102-118 comprising method 100 may depend on the implementation chosen.

At step 102, the host network interface device 48 for Blade A shown in FIG. 1 is powered down, and thus cannot listen for incoming messages via network 16, including wake-up messages (e.g., Magic Packets). Host network interface device 70 of CMC 22 remains powered on, however, such that device 70 can listen for incoming messages via network 16, including wake-up messages and other network traffic.

At step 104, remote node 14 sends out a wake-up packet (e.g., a Magic Packet) via network 16. For example, a user (e.g., a network administrator) may use remote node 14 to send out a wake-up message to remotely wake-up a particular blade A of system 12. The wake-up packet may be broadcast over network 16 or otherwise communicated to system 12 via network 16.

At step 106, the wake-up packet sent from remote node 14 may be received by host network interface device 70 of CMC 22. In this example, the wake-up packet is not received by host network interface device 48 for Blade A, because Blade A is powered down.

At step 108, CMC 22 may determine whether the received packet comprises a wake-up packet. This determination may include various sub-processes, e.g., identifying a packet type (UDP, etc.) for the packet, identifying an IP port for the packet, and/or determining whether the packet is a wake-up packet.

If the packet is not identified as a wake-up packet, host network interface device 70 of CMC 22 may continue to listen for wake-up packets (as well as other network traffic), as indicated at step 110.

However, if the packet is identified as a wake-up packet at step 108, CMC 22 may determine at step 112 whether the wake-up packet is intended for a blade 20 managed by controller 22. This determination may include various sub-processes, e.g., identifying an address in the wake-up packet (e.g., a MAC address), accessing a list of addresses (e.g., MAC addresses) for each blade 20 managed by controller 22 (such list may be stored as address information 80), and determining whether the address identified in the wake-up packet matches an address for any of the blades 20 managed by controller 22.

If CMC 22 determines at step 112 that whether the wake-up packet is not intended for a blade 20 managed by controller 22, controller 22 may continue to listen for wake-up packets, as indicated at step 110.

However, if CMC 22 determines at step 112 that whether the wake-up packet is intended for a blade 20 managed by controller 22, at step 114, controller 22 may identify the particular blade 20 that matches the address in the wake-up packet. For example, CMC 22 may identify the intended blade 20 based on address information 80 and the address in the wake-up packet. In this example, controller 22 may identify Blade A as the intended target for the wake-up packet.

At step 116, CMC 22 may forward the wake-up packet to the intended blade 20, namely Blade A. For example, controller 22 may forward the wake-up packet to Blade A via management communication channel 60.

At step 118, Blade A may receive the wake-up packet forwarded from CMC 22 via management communication channel 60. In response to receiving the wake-up packet, HMC 46 of Blade A may cause Blade A to boot up, or "awaken" from a non-awake state.

Steps 108, 112, and 114 regarding the processing of the wake-up packet by CMC 22 may be performed by any suitable component(s) of controller 22. In some embodiments, some or all of steps 108, 112, and 114 may be performed by host network interface device 70 (e.g., by firmware, software, or other logic associated with device 70) of controller 22. For example, host network interface device 70 may include firmware operable to actively match a MAC address of received Magic Packets with the MAC addresses of blades 20 managed by controller.

In other embodiments, some or all of steps 108, 112, and 114 may be performed by hardware, firmware, software, and/or logic otherwise associated with controller 22, e.g., software stored in memory 66. For example, host network interface device 70 may include firmware to forward a received wake-up message along to processor 64, and processor 64 may access software (e.g., stored in memory 66) for determining which blade 20, if any, the wake-up message is intended for.

According to method 100 discussed above, a wake-up message (e.g., Magic Packets) may be received and processed (including forwarding to the intended blade 20) by CMC 22, rather than by a host network interface device 48 of the intended blade 20. Thus, the host network interface device 48 of the intended blade 20 is not needed for listing for wake-up messages, and may thus be powered down, which may provide power savings benefits. In addition, in some embodiments or situations (e.g., if all blades 20 of system 12 are in a sleep or powered down mode), switch 30 may also be powered down, which may provide even further power savings benefits.

Method 100 may be implemented using system 12 or any other system operable to implement method 100. In certain embodiments, method 100 may be implemented partially or fully in hardware, software, firmware, and/or other logic embodied in tangible computer readable media. As used in this disclosure, "tangible computer readable media" means any instrumentality, or aggregation of instrumentalities that may retain data and/or instructions for a period of time. Tangible computer readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or a physical or virtual storage resource. As discussed above, in certain embodiments, such tangible computer readable media may include memory 66 in CMC 22.

FIG. 3 is a flowchart illustrating an example method 200 for processing a Magic Packet according to a particular embodiment of the present disclosure.

According to one embodiment, method 200 preferably begins at step 202. As noted above, teachings of the present disclosure may be implemented in a variety of configurations of system 12. As such, the preferred initialization point for method 200 and the order of the steps 202-218 comprising method 200 may depend on the implementation chosen.

At step 202, CMC 22 receives an Ethernet packet via network 16. At step 204, CMC 22 determines whether the received packet is a UDP Broadcast packet type. If not, controller 22 may process the packet as appropriate and continue to listen for Magic Packets at step 206.

If the received packet is a UDP Broadcast packet type, controller 22 may determine whether the IP port of the packet is WoL at step 208. If not, controller 22 may process the packet as appropriate and continue to listen for Magic Packets at step 206.

If the IP port of the packet is WoL, controller 22 may determine whether the packet is a Magic Packet at step 210. If not, controller 22 may process the packet as appropriate and continue to listen for Magic Packets at step 206.

If controller 22 determines that the packet is a Magic Packet, controller 22 may determine whether a MAC address of the Magic Packet matches the MAC address of any blade 20 in system 12 at step 212. If not, controller 22 may drop the Magic Packet at step 214.

If controller 22 determines that the MAC address of the Magic Packet does match the MAC address of a blade 20 in system 12, controller 22 or blade 20 may determine if WoL is enabled for the blade 20 at step 216. As is known in the art, a blade (e.g., an NIC port of the blade) may be enabled or disabled for WoL. If WoL is not enabled for the blade 20, the Magic Packet may be dropped at step 214. However, if WoL is enabled for the particular blade 20, a WoL sequence may be initiated on the blade 20 to wake or boot the blade 20 at step 218.

Using method 200, a Magic Packet may be received and processed (including forwarding to the intended blade 20) by CMC 22, rather than by a host network interface device 48 of the intended blade 20. Thus, the host network interface device 48 of the intended blade 20 is not needed for listing for wake-up messages, and may thus be powered down, which may provide power savings benefits. In addition, in some embodiments or situations (e.g., if all blades 20 of system 12 are in a sleep or powered down mode), switch 30 may also be powered down, which may provide even further power savings benefits.

Method 200 may be implemented using system 12 or any other system operable to implement method 200. In certain embodiments, method 200 may be implemented partially or fully in software, firmware, or other logic embodied in tangible computer readable media. As used in this disclosure, "tangible computer readable media" means any instrumentality, or aggregation of instrumentalities that may retain data and/or instructions for a period of time. Tangible computer readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or a physical or virtual storage resource.

Although the present disclosure has been described in detail, it should be understood that various changes, substitutions, and alterations can be made hereto without departing from the spirit and the scope of the invention as defined by the appended claims.

What is claimed is:

1. A system, comprising:
   a plurality of information handling systems, each including a first network interface device configured to receive wake-up messages remotely via a network and a second network interface device;
   a management controller coupled to and configured to manage the plurality of information handling systems, the management controller operable to:
   receive a wake-up message remotely via the network, the wake-up message including an address identifying a particular one of the information handling systems to be awakened from a non-awake state;
   identify the particular information handling system based at least on the address included in the received wake-up message; and
   forward the wake-up message to the particular information handling system to cause the particular information handling system to awaken; and
   wherein the first network interface device of the particular information handling system configured to receive wake-up messages remotely via the network is not powered while the wake-up message is received and forwarded by the management controller; and wherein the second network interface device of the particular information handling system is configured to:

receive power when the wake-up message is forwarded by the management controller; and receive the wake-up message forwarded by the management controller.

2. A system according to claim 1, wherein the wake-up message comprises a User Datagram Packet (UDP) broadcast packet.

3. A system according to claim 1, wherein the wake-up message comprises a Wake-on-LAN (WoL) Magic Packet.

4. A system according to claim 1, wherein:

the management controller is coupled to the particular information handling system by a backplane; and the management controller is configured to forward the wake-up message to the particular information handling system via the backplane.

5. A system according to claim 1, further comprising:

a server chassis including a backplane;

the plurality of information handling systems comprise a plurality of blade servers coupled to the backplane; and the management controller comprises a chassis management controller coupled to the backplane.

6. A system according to claim 1, wherein the management controller identifies the particular information handling system by:

identifying a Media Access Control (MAC) address defined in the wake-up message;

accessing a list of MAC addresses for each of the plurality of information handling systems managed by the management controller; and identifying the particular information handling system based on the accessed list of MAC address.

7. A system according to claim 1, wherein:

the first network interface device of the particular information handling system configured to receive wake-up messages remotely via the network comprises a Local Area Network (LAN) on motherboard (LOM); and the LOM is not powered while the wake-up message is received and forwarded by the management controller.

8. A method for managing a remote wake-up of an information handling system, comprising:

receiving a wake-up message at a management controller coupled to and configured to manage a plurality of information handling systems, the wake-up message received from a remote system via a network, the wake-up message including an address identifying a particular one of the information handling systems to be awakened from a non-awake state;

the management controller identifying the particular information handling system based at least on the address included in the received wake-up message; and the management controller forwarding the wake-up message to the particular information handling system to cause the particular information handling system to awaken;

wherein a first network interface device of the particular information handling system that is configured to receive wake-up messages via the network is not powered while the wake-up message is received and forwarded by the management controller; and wherein a second network interface device of the particular information handling system, configured to receive power when the wake-up message is forwarded by the management controller, receives the wake-up message forwarded by the management controller.

9. A method according to claim 8, wherein the wake-up message comprises a User Datagram Packet (UDP) broadcast packet.

10. A method according to claim 8, wherein the wake-up message comprises a Wake-on-LAN (WoL) Magic Packet.

11. A method according to claim 8, wherein:

the management controller is coupled to the particular information handling system by a backplane; and the management controller forwards the wake-up message to the particular information handling system via the backplane.

12. A method according to claim 8, wherein:

the plurality of information handling systems comprise a plurality of blade servers in a server chassis; and the management controller comprises a chassis management controller coupled to the plurality of blade servers by a backplane.

13. A method according to claim 8, wherein identifying the particular information handling system based at least on the address included in the received wake-up message comprises:

identifying a Media Access Control (MAC) address defined in the wake-up message;

accessing a list of MAC addresses for each of the plurality of information handling systems managed by the management controller; and identifying the particular information handling system based on the accessed list of MAC address.

14. A method according to claim 8, wherein the first network interface device of the particular information handling system comprises a Local Area Network (LAN) on motherboard (LOM).

15. A method according to claim 8, further comprising:

the management controller identifying an address defined in the wake-up message;

the management controller accessing a list of addresses for the plurality of information handling systems managed by the management controller; and the management controller determining whether the address corresponds to any of the plurality of information handling systems.

16. A management controller for managing a plurality of information handling systems, each including a first network interface device configured to receive wake-up messages remotely via a network and a second network interface device, the management controller configured to:

receive a wake-up message remotely via the network, the wake-up message including an address identifying a particular one of the information handling systems to be awakened from a non-awake state;

identify the particular information handling system based at least on the address included in the received wake-up message; and forward the wake-up message to the particular information handling system to cause the particular information handling system to awaken; and wherein the first network interface device of the particular information handling system configured to receive wake-up messages remotely via the network is not powered while the wake-up message is received and forwarded by the management controller;

wherein the second network interface device of the particular information handling system is configured to:

receive power when the wake-up message is forwarded by the management controller; and receive the wake-up message forwarded by the management controller.

17. A management controller according to claim 16, wherein the wake-up message comprises a Wake-on-LAN (WoL) Magic Packet.

18. A management controller according to claim 16, wherein:
   the management controller is coupled to the particular information handling system by a backplane; and
   the management controller forwards the wake-up message to the particular information handling system via the backplane.

19. A management controller according to claim 16, wherein:
   the plurality of information handling systems comprise a plurality of blade servers in a server chassis; and
   the management controller comprises a chassis management controller coupled to the plurality of blade servers by a backplane.

20. A management controller according to claim 16, wherein identifying the particular information handling includes:
   identifying a Media Access Control (MAC) address defined in the wake-up message;
   accessing a list of MAC addresses for each of the plurality of information handling systems managed by the management controller; and
   identifying the particular information handling system based on the accessed list of MAC address.

* * * * *